J. F. DURYEA.
AUTOMOBILE HOOD.
APPLICATION FILED OCT. 19, 1912.
1,130,262.
Patented Mar. 2, 1915.
2 SHEETS—SHEET 1.
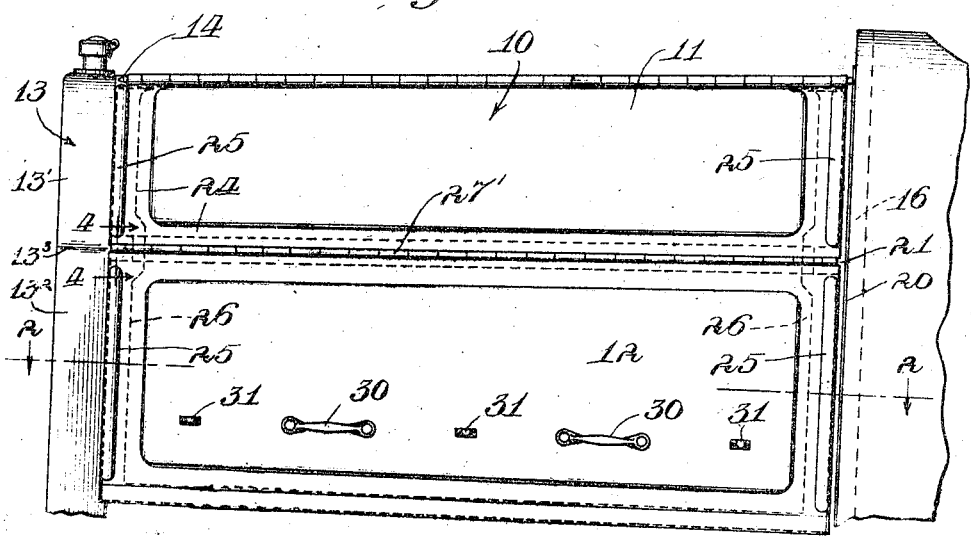
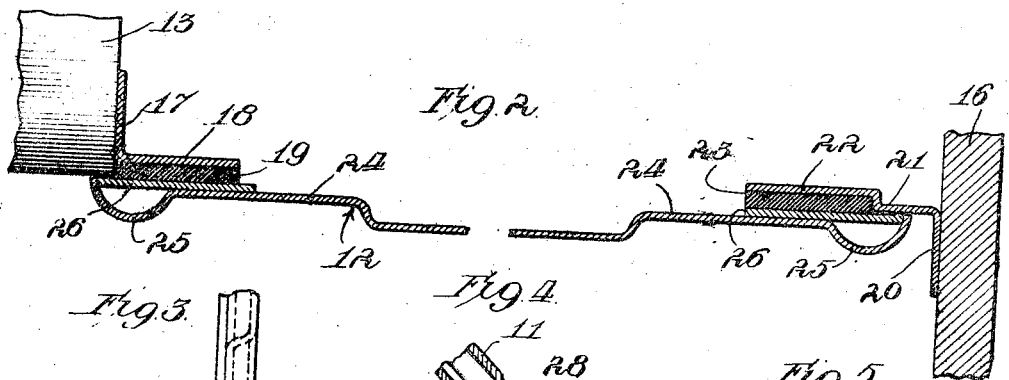
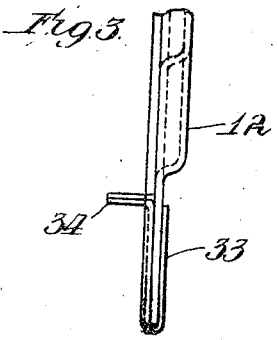
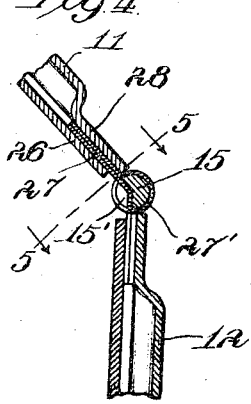
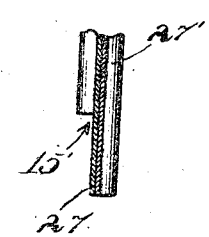
Witnesses:
Harry S. Gaither
E. W. Anderson
Inventor:
James F. Duryea.
by Sheridan, Wilkinson, Scott & Richmond
Attys.

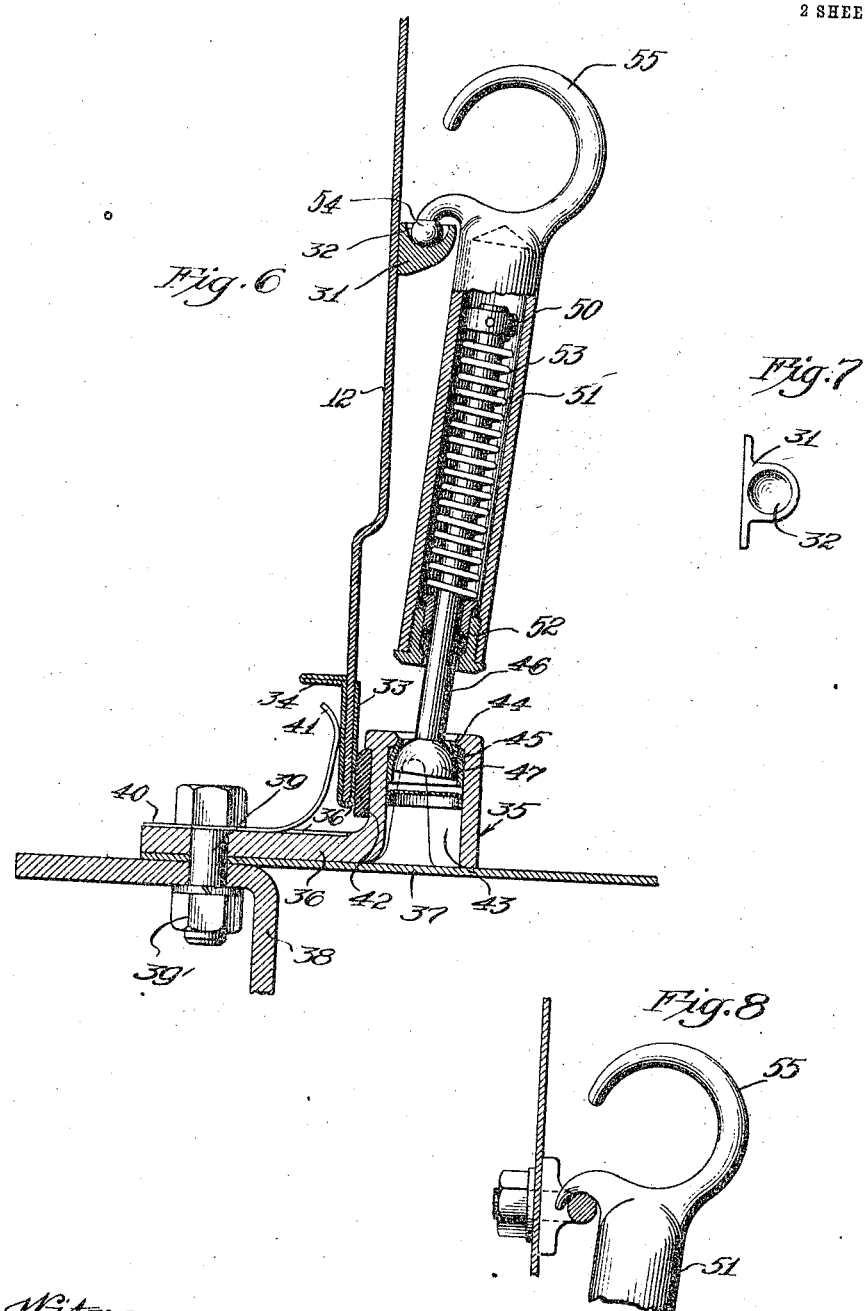

UNITED STATES PATENT OFFICE.

JAMES F. DURYEA, OF SPRINGFIELD, MASSACHUSETTS, ASSIGNOR TO STEVENS-DURYEA COMPANY, OF CHICOPEE FALLS, MASSACHUSETTS, A CORPORATION OF MASSACHUSETTS.

AUTOMOBILE-HOOD.

1,130,262.  Specification of Letters Patent.  Patented Mar. 2, 1915.

Application filed October 19, 1912. Serial No. 726,690.

*To all whom it may concern:*

Be it known that I, JAMES F. DURYEA, a citizen of the United States, residing at Springfield, in the county of Hampden and State of Massachusetts, have invented certain new and useful Improvements in Automobile-Hoods, of which the following is a specification.

This invention relates to improvements in automobile hoods and fastenings therefor.

The object of this invention is to provide an improved automobile hood, and means of supporting and fastening the same, which will eliminate many of the objections now found in such devices.

It has been found in practice that owing to the warping or twisting of automobile frames when traveling over bumps or rough roads, the hood, ordinarily supported between the radiator and the dash of the vehicle, becomes twisted and buckles. It is my aim to provide an improved hood which will be free from this objection, and to provide means for fastening or securing the same, which will coöperate with the said hood in its said function.

A further object is to provide an automobile hood with wearing strips where wear is found to be greatest.

Other objects are set forth and made apparent in the following specification, and in the accompanying drawings in which—

Figure 1 is a side elevation showing my improved hood as carried between the radiator and dash of the vehicle. Fig. 2 is a longitudinal section along the line 2, 2, of Fig. 1. Fig. 3 is a detail elevation. Fig. 4 is a detail sectional view along the line 4, 4 of Fig. 1. Fig. 5 is a detail section along the line 5, 5 of Fig. 4. Fig. 6 is a transverse sectional view, showing my improved means for securing the hood in place. Fig. 7 is a plan detail view of a socket member. Fig. 8 is a detail of a modification.

Like reference numerals refer to like elements throughout the drawings.

10 designates my hood generally, formed with the upper panels 11 suitably curved to get the contour of the radiator 13, and having the lower panels 12. The upper panels are hinged together at their point of juncture to a rod or pintle 14. The adjacent upper and lower panels 12 and 11 are hinged to the rod or pintle 15. The automobile dash is designated by the numeral 16.

The angle member 17 is secured by one flange to the inner or rearward side of the radiator 13 adjacent and slightly below the outer periphery thereof. The flange 18 of the member 17 extends rearwardly from said radiator and is approximately parallel to the outer periphery thereof. Secured to the upper surface of the flange 17 is a leather or similar supporting or deadening strip 19. Projecting outwardly from the front side of the dash 16 is a second angle member 20 having the forwardly projecting flange 21 bent to shape similar to that of the flange 18 of the member 17. This flange 21 is depressed or offset to form the flange 22 in which is seated a deadening strip 23 projecting slightly above the surface of the flange 21—as shown in Fig. 2 of the drawings.

The panels forming the hood 10 are preferably provided with the depressed portions 24 adjacent the periphery of the hood. Located outwardly of said depressed portions 24 are the corrugations or ribs 25. The outer edges of the hood 10 are bent downwardly from the ribbed portions 25 to a point below the level of the depressed portions 24—as shown in Fig. 2. The wearing strip 26 is secured to the inner surface of the hood panels below the ribbed portions 25, the outer edge of the wearing strips 25 being secured to and lying flush with the downwardly bent edge of the hood panels. These wearing strips are adapted to contact with and rest on the supporting strips 19 and 23. Inasmuch as there is a certain amount of wear between the hood and the points of support, these wearing strips are preferably formed of steel or other hard material, thus providing for the wear which would ordinarily take place, were the hood to lie in contact with the deadening strips. It will be noted that these deadening strips 19 and 23 are of such thickness as to project slightly above the outer periphery of the radiator 13 and flange 21, respectively. It will thus be seen that the hood when in closed position—as shown in Figs. 1 and 2—will be supported close to but slightly out of contact with the radiator 13 at its front portion, and the flange 21 at its rear portion. This provides a construction which will permit sliding of the hood relative to the radiator 13 or flange 21, so that there is no restriction of the hood at its ends so as to cause buckling, etc.

The ends of the rod or pintle 14 are normally seated in sockets to prevent upward displacement of the hood, this feature being old in automobile construction. Inasmuch as a large proportion of automobile radiators are provided with a curved upper portion 13' and the downwardly extending sides 13², a more or less sharp angle or edge 13³ is formed. To permit the rod 15 to rest closely adjacent to the periphery of the radiator at such edge, the said rod 15 is cut out at 15'— as indicated in Fig. 4. In hinging the respective panels to the rod 15, metal strips 27 are looped or bent around the rod 15 and the ends thereof are secured between the wearing strips 26 and the edge 28 of the panel. Alternate loops extend from panel 12, the intermediate loops extending from the panel 11. The loop 27' located adjacent the cutout portion 15' of the rod 15 is bent around to closely fit the contour at said point—as shown in Fig. 4.

Secured to the lower panels 12 slightly above their lower edge are the handles 30 adapted to be grasped when raising the hood. Cup members 31 are also secured to the lower panel 12 at predetermined distances thereon, these cup members 31 being provided with a cup or socket 32—as shown in Fig. 7. The lower edges of the panels 12 are provided with looped wearing strips 33, these strips being provided with an angularly disposed flange 34 near the side of said panels. Socket members 35 having rearwardly extending flanges 36 are carried upon the plate 37 which rests upon the panel 38 of the main frame of the vehicle.

A bolt 39 passes through the flange 36 of the member 35, the plate 37 and the panel 38, to secure them together—as shown in Fig. 6. The nut 39', engaging one end of bolt 39, may be utilized to bind them securely in position. The flange 36 of the member 35 is provided with a groove or recess 36' in which is secured beneath the head of the bolt 39 a spring strip 40. The spring strip 40 is bent upwardly, the top edge being also bent backward,—as shown at 41. The front wall of the socket member 35 is provided with a cork or other deadening strip 42 adjacent the upwardly bent portion of the spring strip 40. The lower edge of the panels 12 carrying the looped wearing strips 33 is adapted to be forced downwardly between the upwardly extending portion of the spring strip 40 and the wearing strip 42, the spring strip 40 tending to force the lower portion of the panel 12 into close contact with the wearing strip 42, as illustrated in Fig. 6. The member 35 is provided with a central aperture 43 having the walls thereof inwardly turned to form the flanges 44 at the upper portion thereof. A wearing plate or strip 45 is located in said aperture and in contact with such flanges 44.

A piston member 46 is provided with a hemispherical lower extremity 47 adapted to be held in the socket member 35. This piston member is capable of pivotal movement in any direction about its lower extremity—as will be apparent—the wearing strip 45 serving to receive the wear due to the movement of the hemispherical portion 47. A collar or head 50 is suitably secured to the upper extremity of the piston member 46, and is adapted to reciprocate in the cylinder member 51, the inner diameter of the cylinder member 51 being larger than the diameter of the collar. The cylinder member 51 is provided with a conventional form of gland or stuffing box 52 at its lower extremity. A spring 53 is carried between the collar 50 in the stuffing box 52 and serves to normally keep the piston in its upward position with respect to said cylinder member. The latter is formed with an outwardly and downwardly extending ball shaped finger 54 adapted to seat in the cup 32 of the cup member 31. Upwardly thereof the cylinder member 51 is provided with a gripping portion 55—as shown in Fig. 6—adapted to be engaged by a finger of the operator, to raise the finger 54 out of engagement with the cup member 31.

It will be apparent from the description and showing that a ball and socket action takes places between the member 35 and the piston 46 and also between the finger 54 and the cup 31. The spring 53 furnishes a yielding engagement between the piston 46 and the cylinder 51 which may be kept filled with oil or other suitable lubricant.

Upon lateral sliding movement of the hood 10 relative to the radiator and dash upon which it is indirectly supported, it will be apparent that the securing means comprising the piston 46 and cylinder 51 will by means of the spring 53 and the respective ball and socket mountings give sufficiently to permit such movement and at the same time the hood normally seated or closed.

While I have shown and described my invention in more or less particularity, I do not wish to be unduly restricted to the form shown and described beyond the scope of the appended claims.

What I claim is:

1. An automobile hood, said hood being provided with a rib or corrugation adjacent each end, and a wearing strip secured to the under surface of said hood beneath said rib.

2. An automobile hood, said hood being provided with a rib or corrugation adjacent each end, and a wearing strip secured to the under surface of said hood beneath said rib, the edge of said hood being bent downwardly to lie flush with the under surface of said wearing strip.

3. In a vehicle having a radiator, a hood, said hood being supported to rest slightly outside the projection of the peripheral surface of said radiator, said hood being capable of a sliding movement relative to said radiator.

4. In combination with an automobile dash, a flange secured to the forward side thereof, said flange being provided with a depressed outward portion, a supporting strip carried by said depressed portion of said flange, and a hood adapted to rest on and be supported by said flange and supporting strip.

5. In combination with an automobile dash, a flange secured to the forward side thereof, said flange being provided with a depressed outward portion, a supporting strip carried by said depressed portion of said flange, and a hood adapted to rest on and be supported by said flange and supporting strip, said supporting strip being of such size as to hold said hood slightly out of contact with the undepressed portion of said flange.

6. The combination with an automobile radiator, a flange secured to the rearward side of said radiator and projecting outwardly therefrom, and a hood overlapping said radiator and adapted to be supported by said flange.

7. The combination with an automobile radiator, a flange secured to the rearward side of said radiator and projecting outwardly therefrom, and a hood adapted to be supported by said flange slightly out of contact with said radiator, whereby said hood may move laterally over said radiator.

8. The combination with a radiator, an angle member secured by one flange to the rearward side of said radiator, the other flange of said angle member projecting rearwardly from said radiator, a supporting strip of compressible material secured to said flange, and a hood resting upon and adapted to be supported by said flange and supporting strip.

9. The combination with a radiator, an angle member secured to the rearward side thereof having one flange secured to the rear side thereof and having its other flange projecting rearwardly therefrom in a plane below the outer periphery of said radiator, a supporting strip secured to said flange and having its upper surface slightly above the outer peripheral surface of said radiator, and a hood adapted to rest upon and be supported by said supporting strip.

10. The combination with a vehicle having a radiator and a dash spaced apart, an angle member secured to said radiator having the flange extending rearwardly therefrom, a second angle member secured to said dash having a flange projecting forwardly thereof, and a hood extending between said dash and said radiator and adapted to be supported by said flanges, said hood overlapping said radiator.

11. The combination with a vehicle having a radiator and a dash spaced apart, an angle member secured to the rear side of said radiator, and having a flange extending rearwardly therefrom in a plane below the outer periphery of said radiator, an angle member secured to the front of said dash, said angle member being provided with a forwardly extending flange, supporting or deadening strips carried by said flanges, and a hood carried upon said supporting strips and flanges.

In testimony whereof, I have subscribed my name.

JAMES F. DURYEA.

Witnesses:
  LILLIAN BEAUDREAU,
  JOSEPH R. GOULD.